April 10, 1928.  
W. ŠIMEK  
1,665,225  
CORN ROASTER  
Filed Dec. 20, 1926

INVENTOR.  
Wendel Šimek  
BY Cornelius Zabriskie  
ATTORNEYS.

Patented Apr. 10, 1928.

1,665,225

UNITED STATES PATENT OFFICE.

WENDEL ŠIMEK, OF GUTTENBERG, NEW JERSEY.

CORN ROASTER.

Application filed December 20, 1926. Serial No. 155,816.

This invention is an apparatus for roasting corn and is particularly adapted to be used in public places, being constructed to attract trade to a stand or booth whereat the apparatus is used.

The object of the invention, primarily, is to economically roast relatively large quantities of corn on the ear in a simple, inexpensive and thoroughly efficient manner. The apparatus is constructed to feed corn on the cob past a heating element from which radiant heat is transmitted to the corn as the latter passes by such element. An important feature of the invention consists in rotating the corn while in proximity to the heating element in order that all sides of each ear of corn may be uniformly cooked.

In a preferred form of carrying out the invention, the heating element, preferably gas or electric, is arranged in an inclined position and directly beneath such heating element is an inclined platform down which the corn is adapted to roll by gravity so that as the corn gravitates down the incline, the rolling thereof will present all sides of each ear to the heater for roasting. The platform is preferably so configurated or formed that the corn will be required to roll and cannot slide in such manner as to cook enough on one side. The movement of the corn down the incline under the force of gravity is preferably controlled by suitable escapement mechanism which may be adjusted to time the travel of the corn and in this way, the apparatus is made automatic in its operation, the timing being such that the period between the movement of the corn into and out of the heating zone is such as to effect a proper roasting of the corn during such period. Accordingly, the corn is discharged from the heating zone in a condition ready for immediate consumption.

In order that the corn may properly roll down the incline and through the heating zone, I preferably provide holders adapted to be positioned between adjacent ends of two ears of corn into which the opposite ends of a holder are adapted to be impaled. When two ears are secured together in the manner described, they will roll much better and more smoothly than if allowed to separately gravitate down the incline and furthermore provide convenient means of handling the hot ears of roasted corn after being discharged from the incline.

The apparatus is entirely automatic in its operation, the unroasted corn being manually fed to the apparatus and manually removed therefrom.

Features of the invention, other than those adverted to, will be apparent from the hereinafter detailed description and claims, when read in conjunction with the accompanying drawings.

The accompanying drawing illustrates one practical embodiment of the invention, but the construction therein shown is to be understood as illustrative, only, and not as defining the limits of the invention.

Figure 1:
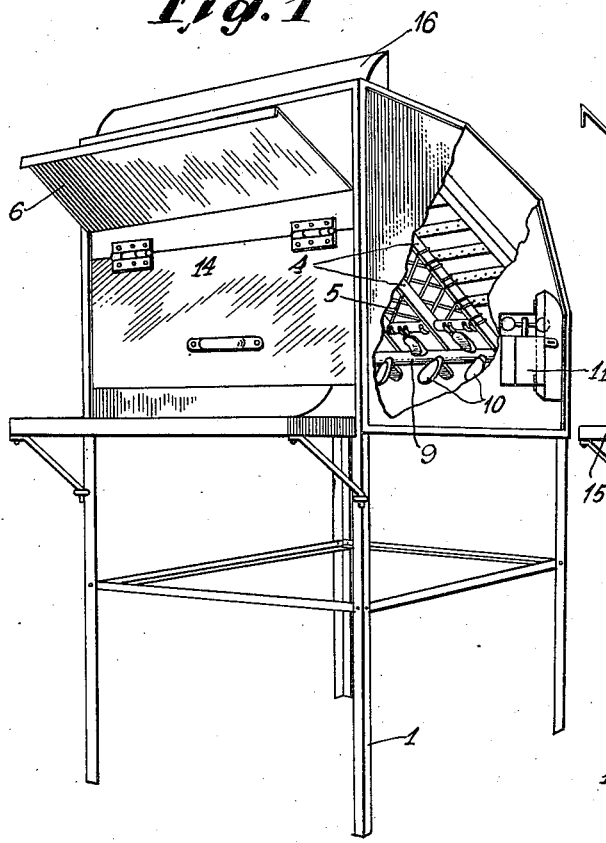
Figure 1 is a perspective view of a corn roaster embodying the present invention with a portion of the wall of the casing broken away to show the interior construction.
Figure 2:
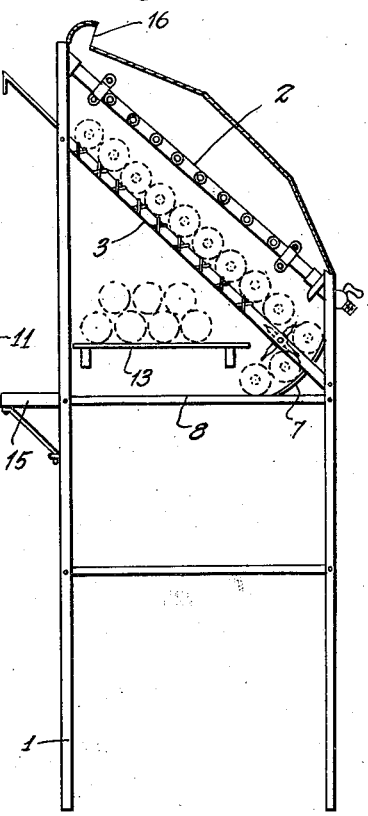
Figure 2 is a side elevation of the apparatus shown in Figure 1 with the near end wall of the casing removed, the escapement mechanism also removed, and the burners shown in section in the interest of clearness; and, Figure 3 shows two ears of corn secured together by a holder forming part of the invention.

Referring to the drawing, 1 designates a suitable frame provided in its upper portion with an inclined heating element 2, shown as a gas burner. An electric heating element may, however, be used. Positioned in substantially parallel relation to the burner 2 and directly beneath the same is an inclined platform 3, shown as constructed from a plurality of parallel bars 4 covered by a wire mesh 5 and which parts collectively form the inclined platform.

The structure of the platform may of course be varied without departing from the spirit of this invention, but I find the arrangement shown highly satisfactory for many reasons. The boards are spaced apart a distance adapting them to properly support the mesh and at the same time permit heat from the burner to pass downwardly about corn resting on the platform.

Corn to be fed to the platform is deposited upon an inclined shelf 6 forming an extension of the upper end of the platform 3 and such corn is adapted to gravitate down the platform to and about a baffle 7 at the bottom thereof to be deposited upon a horizontal shelf 8 below the platform 3.

In order that the passage of the corn down the platform 3 may be slow and regular, I preferably associate with such platform, suitable escapement mechanism whereby the movement of the corn is positively controlled. This escapement may vary without departing from the invention, but, as shown, a shaft 9 extends across the lower portion of the platform and is provided with radially extending fingers 10 against which corn gravitating down the platform is engaged and its movement arrested by the fingers 10 until the shaft rotates to release the corn for further movement. The shaft 9 is connected at one end with any appropriate escapement mechanism which will allow of substantially timed intermittent reciprocations of the shaft.

The weight of the corn on the platform is manifestly imposed upon the fingers 10 which tends to rotate the shaft 9 and by associating suitable stop or escapement means 11 for the shaft, the shaft may be permitted to rotate periodically to permit the discharge of roasted ears of corn down the discharge incline 7 and the infeed at the top of the apparatus of uncooked ears of corn. The ears of corn may be fed loosely on to the platform 3, but as they have a tendency to twist while rolling, it is preferred to secure each two ears of corn after the manner shown in Figure 3 by means of an interposed holder 12. Such holder is preferably in the form of a metallic ring provided at its opposite sides with diverging spurs adapted to be forced into the ends of two ears of corn to secure them in substantial alinement and to provide a convenient means for removing the assembly from the apparatus after the corn has been roasted.

Figure 3:
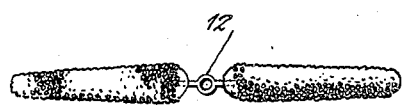

When corn ears, assembled as shown in Figure 3, are placed on the receiving shelf 6, they will gravitate on to the inclined platform 3, and will fill the platform from top to bottom with the constant tendency to roll down the incline. The use of wire mesh on the incline increases the tendency to roll over that which would be present if the surface of the incline were smooth. It is for this reason, among others, that the wire mesh is used as a part of the inclined platform 3.

Thus as the escapement permits the corn to travel downwardly over the incline the corn will be rotated at each successive movement, so that by the time the corn reaches the bottom of the incline and is ready to be discharged through the escapement mechanism to which I have referred, said corn will be rotated at each forward movement thereof. Thus, by the time the corn has reached the bottom of the incline 3, it will have been thoroughly roasted by the radiant heat from the burner and when the corn comes to rest on the shelf 8, it is fully cooked and ready for consumption at once. It may be desirable to provide within the apparatus a storage shelf 13 for storing the surplus roasted corn in order that a stock may be kept on hand for prospective customers.

The upper portion of the apparatus is enclosed within suitable sheet metal housing which precludes the undue distribution of heat and constitutes in effect an oven in which the roasting operation is carried on. The corn stored upon the platform 13 is housed within the so-called oven and is thus kept warm and palatable.

To allow of access to the oven or casing, the front portion thereof is preferably provided with a suitable hinged door 14 and the shelf 8 is extended beyond the front of the frame to form a delivery shelf 15 to permit of convenient dispensing.

Surplus heat is adapted to escape through the top of the apparatus by way of a small open ended hood 16.

One of the most important features of the present invention resides in the fact that the corn is continually turned while the roasting operation is proceeded with in order that all sides of the ear may be presented to the heat to obtain absolute uniform roasting throughout.

A further important feature of the invention is inherent in the fact that the movement of the corn down the incline under the force of gravity, operates automatic mechanism to control the speed of the passage of the corn through the heating zone. The apparatus therefore does not require any extraneous power for its operation. In other words, no motor, sprockets or other operating parts, controlled by outside power, are required. The apparatus is thoroughly automatic in its operation and the product is uniformly cooked.

The foregoing detailed description sets forth the invention in its preferred practical form, but the invention is to be understood as fully commensurate with the appended claims.

For example, in the showing of the drawings, the corn is caused to roll by delivering it upon an inclined platform down which it travels by gravity. I may, in practice, however, cause the corn to roll over a stationary horizontal platform in proximity to the source of heat by a suitable conveyor driven in any appropriate manner.

Having thus fully described the invention, what I claim as new and desire to secure by Letters Patent is:

1. In a corn roaster, a source of radiant heat, a stationary inclined platform in proximity to the said source of radiant heat so constructed as to engage the corn and cause it to roll as it gravitates down the platform, and means disposed near the lower end of the platform in the path of the rolling corn and actuated by the weight of the corn coming in contact therewith and thereby given a step by step movement.

2. In a corn roaster, a source of radiant heat, a stationary inclined platform in proximity to the said source of radiant heat and so constructed as to engage the corn and cause it to roll as it gravitates down the platform, and rotary means disposed near the lower end of said platform in the path of the descending corn actuated by the contact of the corn therewith for periodically releasing the lowermost ear of corn.

3. A corn roaster in accordance with claim 2 in which there is a baffle disposed below said rotary means.

4. A corn roaster in accordance with claim 2 in which there is provided escapement mechanism associated with said rotary means for periodically releasing the lowermost ear of corn.

In testimony whereof, WENDEL ŠIMEK, has signed his name to this specification, this 16th day of December, 1926.

WENDEL ŠIMEK.